United States Patent Office 3,218,247
Patented Nov. 16, 1965

---

3,218,247
PHOTOCHEMICAL METHOD OF PRODUCING CYCLOALKANONEOXIME HYDROCHLORIDES
Yoshikazu Ito and Seiichi Torimitsu, Nagoya-shi, Aichi-ken, Japan, assignors to Toyo Rayon Kabushiki Kaisha, Tokyo, Japan, a corporation of Japan
No Drawing. Filed Sept. 26, 1961, Ser. No. 140,683
Claims priority, application Japan, May 2, 1961, 36/15,309
8 Claims. (Cl. 204—162)

This invention relates to a method of producing with good yield cycloalkanoneoxime hydrochlorides by feeding additionally chlorine to the photochemical reaction zone when cycloalkanes are photochemically reacted with nitrosyl chloride in the presence of hydrogen chloride.

In the photochemical nitrosation of cycloalkanes by means of nitrosyl chloride to produce the corresponding cycloalkanoneoxime hydrochlorides the method of feeding hydrogen chloride gas together with the nitrosyl chloride to the photoreaction zone and the method in which the cycloalkanes of the photoreaction zone are saturated in advance with hydrogen chloride to which later a nitrosyl chloride gas is fed are both known.

The most serious drawback in these known methods was the fact that the reaction rates were slow, i.e., the quantity produced of the oximes per unit quantity of light was low.

Upon investigating into this matter we found that the reaction in which the chlorine radicals were formed by the photodissociation of nitrosyl chloride was the rate-determining step in the photoreaction of nitrosyl chloride with cyclohexane to form cycloalkanoneoxime hydrochlorides.

On the basis of this discovery we furthered our researches for finding a way of enhancing the reaction rate of the present reaction, and as a result we were able to confirm that the reaction rate could be markedly increased if the photonitrosation reaction of cycloalkanes was conducted using a gas consisting of nitrosyl chloride and hydrogen chloride to which has been added additionally chlorine.

In short, by feeding to the photochemical reaction zone additionally chlorine besides nitrosyl chloride and hydrogen chloride the concentration of the chlorine radicals that occur by means of the light becoming great, the reaction rate of the present photochemical reaction as a whole is enhanced markedly.

When using chlorine together in the present invention, if the quantity used of chlorine is too great, the production of chlorination products, i.e., by-products, increases greatly. Therefore it is not desirable to use chlorine to excess.

As the quantity to be used, the ratio in which $Cl_2/NOCl$ ranges from 1 to $1/200$ is suitable, it being particularly preferable that this ratio be less than $1/2$. When this ratio becomes too small, the effects of the reaction rate increase resulting from the addition of chlorine is lost. As disclosed in our copending application, for controlling the formation of by-products the reaction temperature of the present reaction should be held to below 50° C., a low temperature of —10° C. to 20° C. being particularly preferred. Furthermore, it is preferred that the nitrosyl chloride and the chlorine being used are in a state in which they have been diluted with hydrogen chloride and/or an inert gas such as hydrogen, nitrogen, carbon dioxide gas etc., and that the partial pressure of nitrosyl chloride is from about 5 to 80 mm. Hg.

Accordingly, in the present invention nitrosyl chloride and chlorine are fed to the photochemical reaction zone. In feeding the nitrosyl chloride and chlorine the two may be mixed in advance and fed, or they may be fed from separate pipes. The foregoing nitrosyl chloride and chlorine may be mixed further with hydrogen chloride, or hydrogen chloride and an inert gas such as, for example, hydrogen, nitrogen or carbon dioxide gas, and then fed to the photochemical reaction zone.

While hydrogen chloride is suitably added at the rate of 2 or more mols thereof to each mol of nitrosyl chloride in case the hydrogen chloride has not been caused to be absorbed by the cycloalkane in advance, in case hydrogen chloride has been caused to be absorbed by the cycloalkane in advance hydrogen chloride need not necessarily be fed together with the nitrosyl chloride and chlorine.

Although the pressure of the mixed gas when being fed to the photochemical reaction zone may be either at atmospheric pressure, under elevated pressure or at reduced pressure, it is most suitably carried out by first mixing in advance all of the gases to be used, namely, nitrosyl chloride gas, chlorine gas and hydrogen chloride and/or an inert gas; and then feeding this mixed gas after having imparted to it a slight pressure so that it is higher than the atmospheric pressure.

The blowing in of this mixed gas to the cycloalkane is suitably performed by a method in which good contact is achieved between the liquid and gas in the whole of the photoreaction zone, an example being the method in which a plurality of blowing-in holes are provided in a vertical direction by which the gas is separated into minute bubbles and blown in. And as the quantity to be blown in, that which is about 150–300% of the theoretical quantity consumed at the reaction temperature used is suitable.

When the invention is carried out under the conditions as described hereinabove, the formation of by-products is held to a minimum, and moreover the production of oxime hydrochlorides per unit quantity of light shows a marked improvement.

As the cycloalkanes that are used in the invention there can be named those having 5 to 8 carbon atoms such as cyclopentane, cyclohexane, cyclooctane, etc.

While according to the invention the reaction is preferably carried out at a low temperature, if in the case the cycloalkane should freeze at the reaction temperature used, it is preferred that the freezing of the cycloalkane be prevented by the addition of such as benzene, carbon tetrachloride, etc., as to render it into a liquid phase and then the mixed gas of nitrosyl chloride, hydrogen chloride and chlorine be introduced thereto.

To illustrate the invention the following examples are given:

*Example 1*

In a cylindrical glass vessel 26 cm. in height and having an inside diameter of 9.5 cm. and provided with a tap at its bottom was placed about 1 liter of cyclohexane. Then into this was inserted a high pressure mercury lamp contained in a double glass tube so constructed as to allow the flow of cooling water therethrough; a thermometer and gas blowing-in tube were provided in said glass vessel so as to reach the cyclohexane phase by means of a rubber stopper and at the same time an exhaust tube was also fitted in said glass vessel with the rubber stopper; and the system cooled from the outside with ice water. Maintaining the reaction temperature at 12° C., nitrosyl chloride at the rate of 160 cc. per minute, hydrogen chloride at 3 liters per minute and chlorine at 4 cc. per minute were mixed and blown in under irradiation of the cyclohexane phase. The color of the reaction mixture changed from colorless to light yellow and then to light yellow-green. In about 10 minutes an oil-like substance of light yellow to light yellow-green was separated and was drawn from the tap. Thus after a reaction time of 4 hours 90.5 grams of this oil-like substance was obtained, which when dissolved in a small amount of water and neutralized with 4 N caustic soda at pH 5.4 yielded 51.3 grams of cyclohexanoneoxime whose melting point was 89° C.

When the reaction was carried out with this same apparatus but without the addition of chlorine, 79.0 grams of the oil-like substance was obtained, which, upon neutralization, yielded 42.5 grams of cyclohexanoneoxime.

Therefore the increase in yield was about 21% when the reaction was performed according to the present invention.

*Example 2*

When the reaction was carreid out using the same reaction apparatus and the same method as in Example 1, except that the quantity of chlorine blown in was at the rate of 22 cc. per minute, 96.2 grams of an oil-like substance was obtained, which, upon neutralization, yielded 55.0 grams of cyclohexanoneoxime, the increase in yield was about 29%.

*Example 3*

When the reaction was performed using the same apparatus and method as in Example 1, except that in lieu of cyclohexane cyclooctane was used, 110.2 grams of an oil-like substance was obtained, which when neutralized as in Example 1 yielded 76.5 grams of cyclooctanoneoxime whose melting point was 36.5° C.

When this reaction was performed as above, except that chlorine was not added, 90.0 grams of an oil-like substance was obtained, which yielded 61.2 grams of cyclooctanoneoxime. Thus the increase in yield when the reaction was performed according to the invention was 25%.

*Example 4*

The reaction apparatus as in Example 1 was cooled from the outside with methanol-Dry Ice. The reaction vessel was charged with 950 cc. of cyclohexane and 50 cc. of carbon tetrachloride, and the reaction was carried out at a temperature of 0°–3° C. by blowing in a mixed gas of 160 cc. per minute of nitrosyl chloride, 3 liters per minute of hydrogen chloride and 20 cc. per minute of chlorine. After a reaction time 4 hours, 94.6 grams of an oil-like substance was obtained, which upon neutralization, yielded 53.3 grams of cyclohexanoneoxime.

When the reaction was carried out in a similar manner but without the addition of chlorine, 80.5 grams of an oil-like substance was obtained yielding 41.5 grams of cyclohexanoneoxime. Therefore, when the reaction was carried out by adding chlorine according to the invention, an increase in yield of about 29% was observed as compared with the instance when chlorine was not added.

Having fully described the invention, what is claimed is:

1. A method of producing photochemically cycloalkanoneoxime hydrochloride which comprises photochemically reacting a cycloalkane with a gaseous mixture consisting essentially of nitrosyl chloride and hydrogen chloride, characterized in that besides said nitrosyl chloride additional chlorine is fed in the form of a gas to the photochemical reaction zone, said chlorine gas being fed at the ratio of $\frac{1}{2}$–$\frac{1}{200}$ mol per each mol of the nitrosyl chloride while the quantity of said hydrogen chloride is at the ratio of at least 2 mols to each mol of the nitrosyl chloride.

2. The method as defined in claim 1 wherein the photochemical reaction is effected by blowing in a mixed gas consisting of hydrogen chloride, chlorine, nitrosyl chloride and an inert gas.

3. The method as defined in claim 2 wherein said inert gas is selected from the group consisting of carbon dioxide gas, nitrogen and hydrogen.

4. The method as defined in claim 1 wherein the photochemical reaction is effected by blowing in to said cyloalkane a mixed gas consisting of hydrogen chloride, chlorine and nitrosyl chloride.

5. The method as defined in claim 1 wherein the reaction temperature is from $-10°$ C. to $50°$ C.

6. The method as defined in claim 1 wherein the partial pressure of the nitrosyl chloride in said gaseous mixture containing the nitrosyl chloride is from 5 to 80 mm. Hg.

7. The method as defined in claim 1 wherein the cycloalkane used is cyclohexane.

8. The method as defined in claim 1 wherein the cycloalkane used is cyclooctane.

References Cited by the Examiner

UNITED STATES PATENTS

| | | | |
|---|---|---|---|
| 2,879,215 | 3/1959 | Reppe et al. | 204—162 |
| 2,885,332 | 5/1959 | Mueller et al. | 204—162 |
| 2,945,065 | 7/1960 | Donaruma | 260—556 |
| 3,047,482 | 7/1962 | Cheng et al. | 204—162 |
| 3,129,155 | 4/1964 | Ito and Endoh | 204—164 |

JOHN H. MACK, *Primary Examiner.*

JOSEPH REBOLD, JOHN R. SPECK, WINSTON A. DOUGLAS, *Examiners.*